United States Patent
Goretta et al.

(10) Patent No.: US 7,413,109 B2
(45) Date of Patent: Aug. 19, 2008

(54) JOINING OF ADVANCED MATERIALS BY SUPERPLASTIC DEFORMATION

(75) Inventors: Kenneth C. Goretta, Downers Grove, IL (US); Jules L. Routbort, Hinsdale, IL (US); Felipe Gutierrez-Mora, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 11/302,419

(22) Filed: Dec. 12, 2005

(65) Prior Publication Data
US 2006/0151582 A1 Jul. 13, 2006

Related U.S. Application Data

(62) Division of application No. 09/924,571, filed on Aug. 7, 2001, now Pat. No. 6,974,070.

(51) Int. Cl.
*B23K 20/00* (2006.01)

(52) U.S. Cl. .................. 228/194; 228/219; 228/220; 228/248.1; 228/256

(58) Field of Classification Search ............. 228/248.1, 228/248.5, 194
See application file for complete search history.

(56) References Cited

U.S. PATENT DOCUMENTS

| | | | | |
|---|---|---|---|---|
| 5,130,277 A | * | 7/1992 | Ueda et al. | 501/88 |
| 5,273,837 A | * | 12/1993 | Aitken et al. | 429/30 |
| 5,344,063 A | * | 9/1994 | Johnston et al. | 228/157 |
| 5,350,637 A | * | 9/1994 | Ketcham et al. | 428/539.5 |
| 5,389,590 A | * | 2/1995 | Nawa et al. | 501/127 |
| 5,462,902 A | * | 10/1995 | Henager et al. | 501/92 |
| 6,331,217 B1 | * | 12/2001 | Burke et al. | 148/522 |
| 6,532,769 B1 | * | 3/2003 | Meinhardt et al. | 65/33.5 |

FOREIGN PATENT DOCUMENTS

JP          407330453 A   * 12/1995

* cited by examiner

*Primary Examiner*—Kiley Stoner
(74) *Attorney, Agent, or Firm*—Cherskov & Flaynik

(57) ABSTRACT

A method for utilizing superplastic deformation with or without a novel joint compound that leads to the joining of advanced ceramic materials, intermetallics, and cermets. A joint formed by this approach is as strong as or stronger than the materials joined. The method does not require elaborate surface preparation or application techniques.

14 Claims, 6 Drawing Sheets

JOINING OF ADVANCED MATERIALS BY SUPERPLASTIC DEFORMATION

This Application is a Divisional of U.S. patent application Ser. No. 09/924,571, filed on Aug. 7, 2001, now U.S. Pat. No. 6,974,070.

CONTRACTUAL ORIGIN OF THE INVENTION

The United States Government has rights in this invention under Contract No. W-31-109-ENG-38 between the U.S. Department of Energy and the University of Chicago representing Argonne National Laboratory.

BACKGROUND OF THE INVENTION

1. Field of the Invention

The present invention relates to a method for joining together multiphase objects, and more particularly, the present invention relates to methods for joining together ceramic shapes to form pore-free joints or junctions at least as strong as the materials being joined, and to join ceramic/metal composites (cermets).

2. Background of the Invention

Ceramics in general are difficult to form into complex shapes. At present, complex ceramic shapes are often prepared by forming the complex shape in the green state and then applying heat to consolidate the shape. This can be difficult and costly.

An alternative method is to form a ceramic blank and then machine the blank into the desired shape. This method also can be difficult, time consuming, expensive, and can introduce faults in the structure, which will reduce performance of the structure significantly or possibly render the shape unusable.

Another alternative is to join simpler shapes to form the desired complex shapes. This alternative is similar to brazing or welding of various metal components to form more complex metal components. Ceramic components have been joined using various glasses and metals as the joining material. However, the resulting joints have poor mechanical properties compared to the materials to be joined, and the application temperatures are limited.

Nanocrystalline materials have been used as joint-forming interlayer constituents between the two ceramic shapes to be joined. F. Gutierrez-Mora, A Dominguez-Rodriguez, J. L. Routbort, R. Chaim, and F. Guiberteau, "Joining of yttria-tetragonal stabilized zirconia polycrystals (Y-TZP) using nanocrystals," *Scripta Mater.*, 41, 455-460 (1999). However, nanocrystalline materials can be very expensive and can be difficult to work with. Nanocrystalline ceramics are difficult to consolidate into a dense body without having the individual grains grow substantially. Growth of the grains eliminates the nanocrystalline nature of the body and renders another common ceramic.

Nanocrystalline materials have other drawbacks. For example, such powders tend to agglomerate badly, hence making it difficult to produce dense bodies or to apply materials uniformly to a surface. Also, nanocrystalline powders are often highly hygroscopic. Adsorption of moisture can make it difficult or impossible to process nanocrystalline ceramic powders into strong, pore-free bodies.

A process called superplastic deformation has been used to join Y-TZP of the same composition as that mentioned in the F. Gutierrez-Mora reference, supra.; J Ye. et al., *Scripta Metall. Mater.*, 33, pp 441-445 (1995); and A. Dominguez-Rodriquez, et al, *J. Mater. Res.*, 39, p1631-1636 (1998). Superplasticity in deformation of materials usually occurs by a process known as grain-boundary sliding. At elevated temperature, under application of a stress, individual grains of the solid slide and rotate past each other so that permanent deformation can take place. Generally for superplasticity to occur, individual grains must remain virtually stable. They cannot grow or change shape significantly, nor should they react with other species present. If grain growth occurs, superplasticity is prevented. As grains grow during deformation, small pores are created. These pores grow and eventually join to form cracks which reduce the ceramic strength.

Many previous efforts using nanocrystalline materials to join objects have resulted in a joint containing inferior, stable residual porosity. R. Chaim et al., *J. Mater. Res.*, 15, pp 1724-1728 (2000). Thus, in these and other similar instances, an expensive, difficult-to-prepare interlayer was required. Either that, or settle for an inferior joint.

Aside from joining ceramic forms, it is also desirous to join shapes comprised of cermets. Cermets are ceramic/metal composites in which ceramic particles are the majority phase by volume. Most cermets contain between 5 and 15 volume percent metal to bind hard ceramic particles such as WC and TiC. Cermets are employed in applications such as cutting tools in which wear resistance is required.

With respect to joining simple cermets to form more complex structures, such as, for example, serrated cutting edges, no joining technology has been found to be widely successful. Conventional welding is ineffective because, at welding temperatures, the ceramic is solid but the metallic phase is liquid. Leaching of the metal and destruction of the cermet occurs during welding.

Conventional brazing or soldering forms joints with insufficient strength for many applications. Also, the resulting joints have poor resistance to heat. Because cutting and grinding operations often produce substantial heating of the cermet tooling, and the stresses on the tooling are high, brazed or soldered joints will fail in most applications.

Complex cermet tooling is typically fabricated to shape. The required procedures make use of intricate and relatively expensive dies or diamond-tooling machining. Furthermore, because of geometric constraints associated with part removal from a die, the shapes that can be formed are limited.

U.S. Pat. No. 6,168,071 awarded to Johns on Jan. 2, 2001 discloses a method for joining materials together by a diffusion process using silver/germanium alloys. No external pressure is applied.

U.S. Pat. No. 5,855,313 awarded to McAfee et al. on Jan. 5, 1999 discloses a method for a two-step brazing process for joining materials with different coefficients of thermal expansion.

U.S. Pat. No. 5,599,419 awarded to Hunter et al. on Feb. 4, 1997 discloses a method for joining plastic materials via a heated blade which simultaneously heats the two surfaces to be joined. The heated blade is removed and the two surfaces are welded together.

U.S. Pat. No. 4,927,475 awarded to Steinleitner et al. on May 22,1990 discloses a method for joining surfaces of different materials by applying a glass coating to the two surfaces to be joined. The surfaces are subsequently joined while heated and under external pressure.

U.S. Pat. No. 4,414,166 awarded to Charlson et al. on Nov. 8, 1983 discloses a method for laser joining of thermoplastic and thermosetting materials by laser radiant energy which causes the thermoplastic material to flow onto the thermosetting material. No external pressure is applied.

U.S. Pat. No. 4,247,345 awarded to Kadija et al. on Jan. 27, 1981 discloses a method for joining sections of synthetic materials by placing a thermoplastic sealing composition in a gap between the materials to be joined and then binding the materials together with subsequent heating of the sealing composition. No external pressure is applied.

A need exists in the art for a ceramic joint forming process that results in joints as strong, or actually stronger than the materials joined. The process should be simple in that no elaborate surface preparation or application techniques are required. The process also should utilize common ceramic materials and readily available equipment to minimize costs. Joining temperatures should be as low as possible to minimize degradation of the ceramics being joined and to minimize the cost and complexity of the tooling needed to form the joints.

There is also a need for a technology for producing robust complex cermet forms from simpler ones. The technology should be simple, inexpensive, require few steps to complete, and require minimal surface preparation. Cermets are difficult to polish (inasmuch as they themselves are used to polish other materials), and so polishing of the cermets resulting from the technology should not be required.

SUMMARY OF THE INVENTION

It is an object of the present invention to provide a method for joining materials that overcomes many of the disadvantages of the prior art.

Another object of the present invention is to provide methods for joining materials wherein the joint formed will actually be stronger than the multiphase materials it joins. A feature of the invented method is the relative stability of the mixtures utilized. An advantage of the invented method is that the propensity for grain growth is greatly reduced through the use of relatively low temperatures.

Yet another object of the present invention is to provide methods for joining multiphase materials that do not require elaborate surface preparation or application techniques. A feature of the invented method for joining cermets is the use of a joint compound that contains a metal also found in the cermet. An advantage of the invented method is that the equipment needed is relatively inexpensive and readily available.

Still another object of the present invention is to provide a method for seamlessly joining ceramic objects to form a construct. A feature of the invented method is that the grain size of the joint compound is smaller than the grain sizes of the constituents making up the shapes joined. An advantage of the invented method is that the strength of the joint is further enhanced due to the lack of porosity which can otherwise weaken the joint.

Another object of the present invention is to provide a method for joining similar or dissimilar multiphase objects. A feature of the invented method is that optimal conditions of temperature and pressure allow for joint formation without an interlayer (i.e. joint compound). An advantage of the invented method is its simplicity of design and operation.

In brief, the invention provides a joint compound to seamlessly join multiphase objects, the compound comprising a first phase, and a second phase mixed with said first phase to create a mixture, wherein said second phase is kinetically stable to said first phase.

The invention also provides a method for seamlessly joining objects made up of certain sized particles, the method comprising: supplying a joint compound having particle sizes smaller than the certain sized particles; applying the joining compound to opposing surfaces of the objects to be joined together; heating the joint to a temperature below the melting point of the lowest melting point constituent of the construct; and applying pressure to the objects so as to direct the surfaces toward each other to create a construct, whereby the joint compound is intermediate the opposing surfaces.

Also provided is a method for seamlessly joining together objects made of cermet, the method comprising selecting opposing surfaces of the objects having surface finishes as defined by root-mean-square values of less than 50 microns; coating the surfaces with a metal fluid; decomposing the metal fluid so as to leave a metal residue on the surfaces; and contacting the surfaces to each other for a time and at a temperature and pressure sufficient to form an irreversible bond between the objects.

The invention provides a construct comprising a first crystalline solid having a first surface directly bonded to a second surface of a second crystalline solid, wherein the finish of the first surface and second surface are less than or equal to two microns (equivalent to a diamond-saw cut surface), as defined by standard root-mean-square values.

BRIEF DESCRIPTION OF THE DRAWINGS

These and other objects and advantages of the present invention will become readily apparent upon consideration of the following detailed description and attached drawing, wherein.

DETAILED DESCRIPTION OF THE INVENTION

Low-cost, highly optimized methods for joining difficult-to-join materials via plastic deformation are provided. The invented process allows the joining of materials of different compositions, with resulting joints that are seamless (i.e., without pores, cracks, or other discontinuities). These joints are as strong or stronger than the structures they bond. By selecting the appropriate ratios of phases in the joint, because of differences in thermal expansion coefficients between constituents, the inventors have been able to tailor residual stresses so that the overall strength of the resulting construct is maximized.

Salient features of the invented warm-to-hot pressing method include the use of joint forming compounds which do not employ nanocrystalline materials. In some instances, no joint-forming compound whatsoever is required. In cermets, where joint compound is used, in the most common application of the invention, the joint has a composition containing the host metal (i.e., a metal also contained in the cermet structures to be joined). Other scenarios utilize joint compound having constituents not similar to those comprising the objects to be joined.

Figure 1:
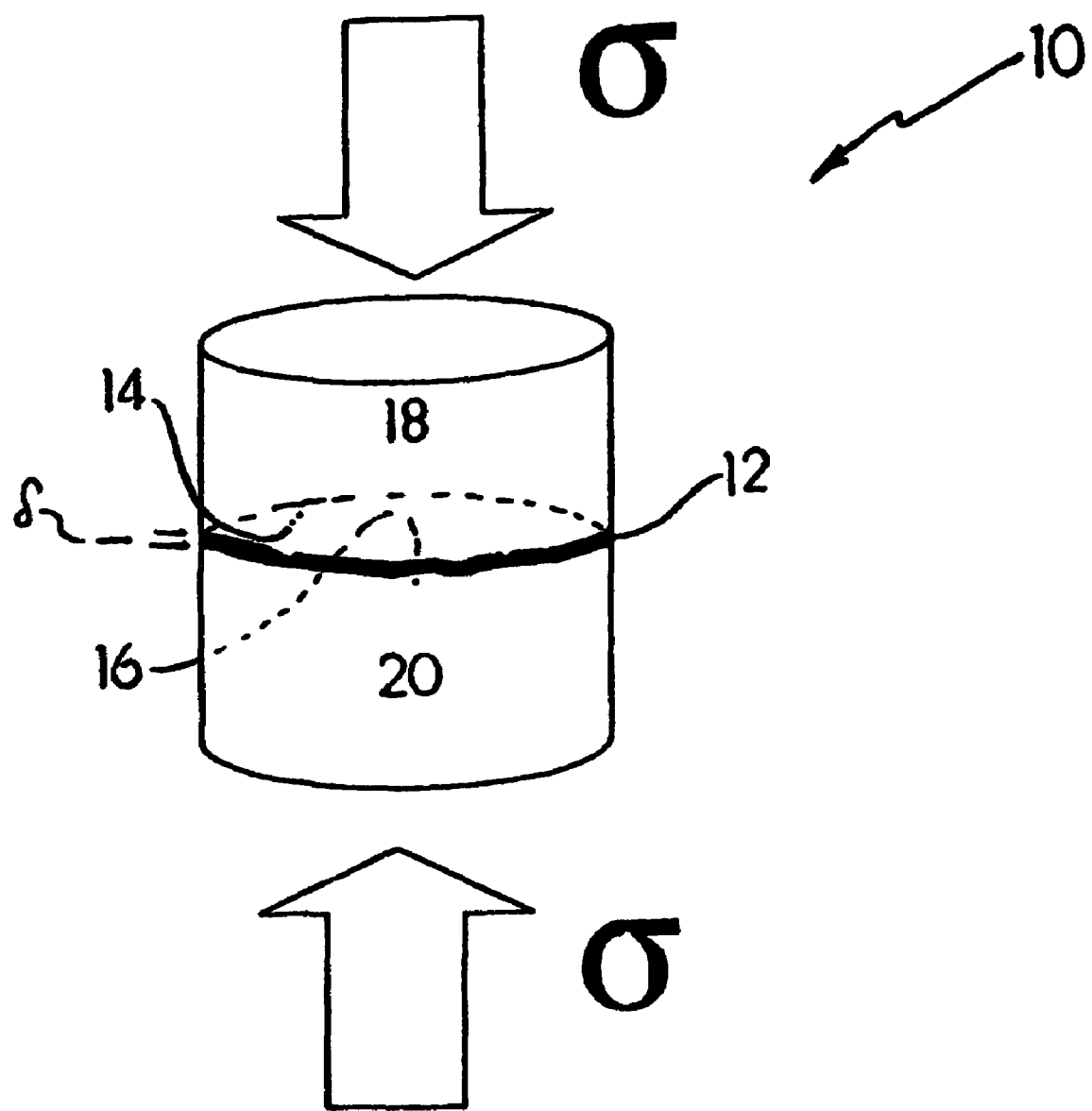
FIG. 1 is a schematic depiction of the invented plastic deformation joining process, in accordance with features of the present invention.

The invention provides for joining shapes by a process that comprises heating the components to an elevated temperature; pressing the shapes together; and doing so with or without use of a joint compound between the shapes to be joined. FIG. 1 depicts the joining process, generally designated as numeral 10. A joint compound 12 is applied to opposing surfaces 14, 16 of adjacent ceramic structures 18, 20.

Thickness δ of the joint compound is a multiple of the dimension of the largest grain size of the components of the compound. Generally, the thickness should be above five times the thickness of the dimension of the largest grain size. Thicknesses of between 5 and 500 times the thickness of the dimension of the largest grain size are most preferable.

Optionally, to form a defect-free joint, pressure is applied to the joint at a level sufficient to effect plastic deformation by grain-boundary sliding. Pressures from 1,000 pounds per square inch (psi) to 45,000 psi are suitable. Typically, the pressure, designated as σ in FIG. 1, is applied so that the opposing faces 14, 16 of the bulk constituents to be joined are directed toward each other during pressure application. Alternatively, pressure may be applied hydrostatically, in which case the entire construct is placed in a chamber and pressure is applied by a controlled atmosphere. The atmosphere is selected to prevent deleterious reaction with the ceramic bodies. For example, if $Si_3N_4$/SiC composites are to be joined, the atmosphere should be rich in nitrogen and very low in oxygen. If electronic ceramic composites, such as those based on $BaCeO_3$, are to be joined, the atmosphere must have an oxygen partial pressure of at least 1 part per million.

Multiphase compounds are joined by the invented method. This incorporation of multiphase materials eliminates the need of expensive nanocrystalline materials. This is because the joint material itself contains sufficient superplastic material to allow for formation of perfect joints. The multiphase materials also permit the formulation of functionally graded materials that exhibit spatially controlled properties, compositions, and residual-stress states.

In multiphase materials, each component has a characteristic thermal expansion coefficient that is different from those of the other constituents. With cooling from the joining temperature, residual stresses will develop in the phases of any material. By selecting which materials are present where, and in what concentrations, the inventors have succeeded in tailoring residual stresses to specific sites of the resulting construct.

For illustrative purposes herein, the multiphase compounds (e.g., two-phase compounds) utilized in the invented protocols are one of two types: (1) ceramics or other materials, in which the crystals of all phases are hard (hardness greater than 1150 on the Knoop scale) and nearly undeformable at room temperature; (2) cermets, in which the crystals of the majority phase are hard and undeformable and the minority, matrix phase is a metal that is deformable at the temperature and stress levels used to form the joint.

Constructs resulting from the joining process can be either homogeneous in constituency (wherein for example, electronic ceramics are joined to electronic ceramics), or heterogeneous in constituency (wherein, for example, electronic ceramics are joined to cermets, or intermetallics, or both). Each of these classes of materials can be joined with or without a joint material between the pieces to be joined. The only requirement is that the objects that are combined into a single piece be composed of stable microstructures (i.e. crystalline grains) that can deform by grain-boundary sliding. In this context, stability refers to lack of significant grain growth of reaction during processing.

In light of the foregoing, while the bulk of this specification details the joining of ceramic and cermet materials, the invented process can be utilized to join a myriad of materials, including but not limited to ceramics, glass-ceramics, hard intermetallics, metals, and combinations thereof.

Residual Stress Detail

The inventors have found that they can place tensile and compressive stresses in specific joint regions where they will (a) do the most good by providing residual stresses that increase the joint strength, (b) do the least harm, or (c) do both. For example, selection of the appropriate ratio of phases in the joint allows one to tailor residual stresses so that the overall strength of the resulting construct is maximized. Stresses can be tailored as to location, magnitude and direction in any stable two- or otherwise multiple-phase composite system.

Figure 3:
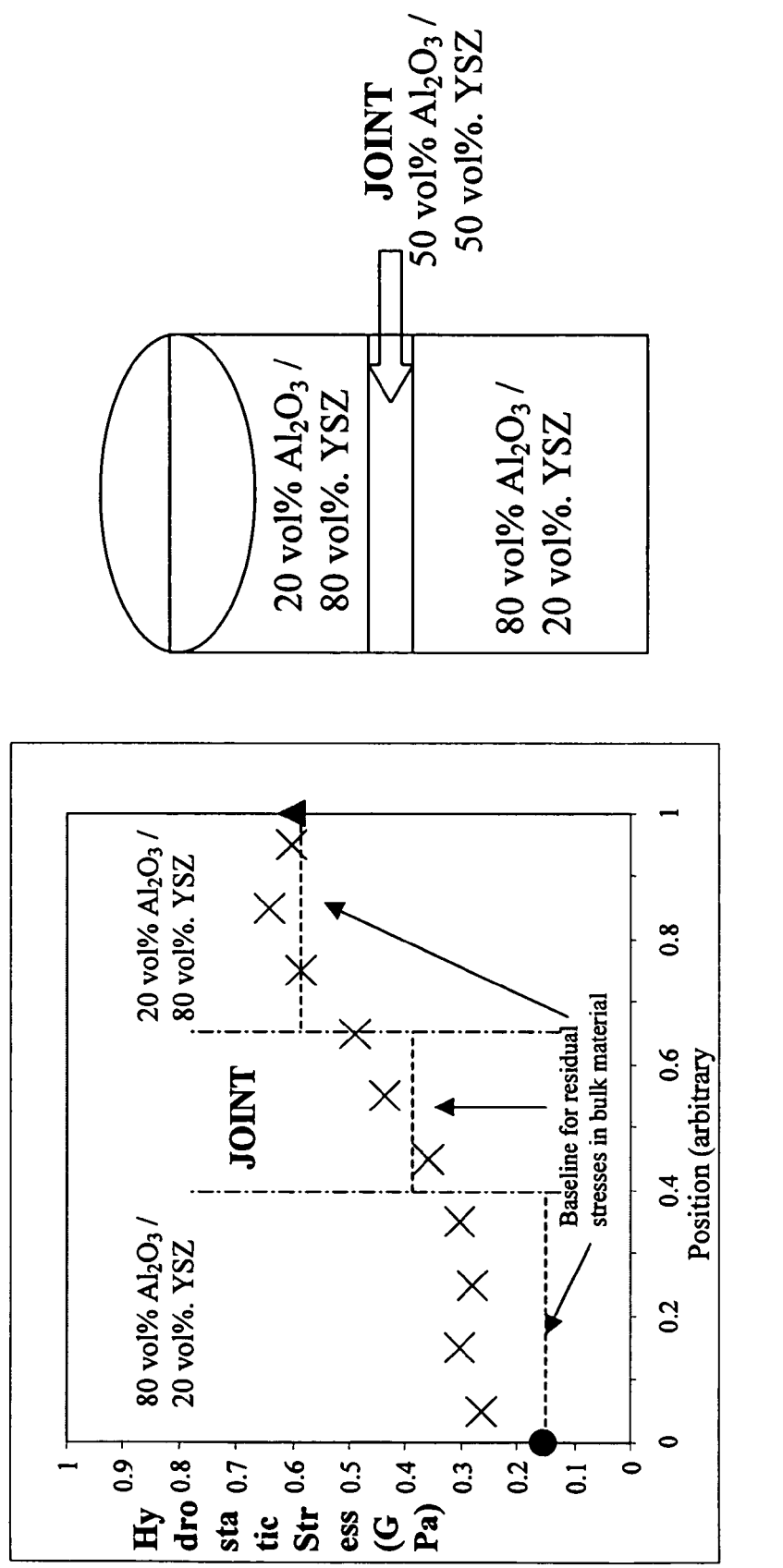
FIG. 3 is a depiction of the residual stresses in a joint formed by joining ZT20A and ZT80A with a joint compound which is ZT50A (50% $Al_2O_3$/50% $ZrO_2$)

As can be noted in FIG. 3, which is discussed in more detail infra, joints which result from the invented process cause a more gradual distribution of stress across subunits of the fabricated construct. Residual stresses can be beneficial, as in the case of compressive stresses acting to minimize crack propagation, or deleterious, as in the case of large tensile stresses promoting crack propagation.

Constituent Ratio and Type for Ceramics Joining Detail

In joining of ceramics and other composite materials in which the individual crystals are brittle and essentially undeformable, the inventors have confirmed that there are specific requirements for the various constituents:

First, phases that come in contact must be kinetically stable with respect to each other. Several ceramic systems exhibit such stability. Examples include, but are not limited to, $Al_2O_3$ and $ZrO_2$; $Al_2O_3$ and YSZ; $Al_2O_3$ and SiC; $Al_2O_3$ and $Y_2O_3$; $Al_2O_3$ and mullite; mullite and $SiO_2$; $ZrSiO_4$ and $SiO_2$; $Al_2O_3$ and $Y_3Al_5O_{13}$; $Si_3N_4$ and SiC. In addition, more than two phases can be present. For example, the three-phase system of $Al_2O_3$, YSZ, and $MgAl_2O_4$ is kinetically stable. During the bonding process, no gross reaction can occur between any of the phases.

Second, at least one of the constituents of the structure (wherein the structure comprises the bulk material and optionally, a joint compound material) should consist of 65% or more by volume of a phase that exhibits superplastic flow at the temperature at which the joint is formed. Superplastic deformation in ceramics can allow for stretching in tension to strains >100%. That is, the ceramic being stretched can double its initial length. Values in excess of 10-times the initial length have been noted.

The inventors have determined that most preferable ceramics and other hard materials that deform superplastically consist of microstructures equiaxed grains (i.e., the grain aspect ratio is approximately 1.) These materials will deform superplastically if the temperature is kept sufficiently low to prevent significant grain growth (inasmuch as deformation rate is a very strong function of temperature). Alternatively, the microstructure must be such that its propensity for grain growth is inherently small. The invention makes use of this type of inherently stable microstructure.

Generally, ceramics and other hard materials to be joined must consist of a mixture of kinetically stable phases in which no one phase makes up more than 85% by volume of the total. This constraint allows for pinning of grain boundaries. The 15% or more of added phases acts to prevent growth of the surrounding grains. In effect, the grains act as mutual obstacles to each other's growth.

The invention does not require, in contrast to previous technologies, that any of the individual components (i.e., either the joined pieces or the joint compound) be entirely superplastic at the temperatures and pressures used for joining. It requires only that approximately 65% or more any one of the components consist of a superplastic material. The other 35% (or less) may consist of any chemically compatible species. This option allows for incorporation of, for example, toughening agents or for functional materials of various forms (for example, addition of an electronically conducting material such as TiC to the insulator $Al_2O_3$). Exemplary toughening agent species include, but are not limited to platelet powders, whiskers and chopped fibers, said entitles comprised of $Al_2O_3$, mullite, $Si_3N_4$, SiC, TiC, and $Y_3Al_5O_{13}$; $SiC/Si_3N_4$, $Al_2O_3$/mullite, or combinations thereof. Unreactive metals also can be utilized, including, but not limited to, W, Pt, Pd, Au—Pd alloys, Ag—Pd alloys, Ni, or Co.

For ceramics, the various phases must be kinetically stable with respect to each other. That is, at the temperature at which the joint is formed, the individual phases must remain distinct and intact. No significant reaction can occur during the joining. The phases may be thermodynamically stable with respect to each other; that is, no reaction occurs at the temperature of joining, irrespective of time. Alternatively, the phases may be reactive, but the reaction must be sufficiently slow so that no significant reactions occur during joining. In the invention, maximum times at the highest temperature are less than three (<3) hours. The phases must remain distinct and intact for at least three (3) hours.

Temperature Detail

The invented protocols utilize low temperatures, i.e., temperatures 600° C., and 1450° C. for ceramics and other hard materials and between 400° C. and 1100° C. for cermets. Generally, temperatures T are less than or equal to approximately $0.7\ T_m$, wherein $T_m$ is the melt temperature of the lowest melting component in the resulting construct. Preferably, the temperature is selected from between 0.5 and $0.7\ T_m$. The low temperature protocol minimizes grain growth within any joints formed, and reduces the cost of heating.

Ceramic Joint Compound Detail

Regarding the use of the invented joint compound, selection of the appropriate ratio of phases in the joint allows one to tailor residual stresses so that the overall strength of the resulting component is maximized.

Typically, the joint compound is a suspended powder. Compound application can be effected in a myriad of ways, including, but not limited to aerosol spraying, other spray coating methods, dip-coating, screen-printing, thick-film deposition, tape-casting, doctor-blading, or electrophoretic deposition.

Not just structural ceramics, but items made from electronic ceramics, metals, intermetallics, cermets and various other composites also can be fabricated via the invented joint compound. The only requirement is that the objects combined be the embodiments of stable microstructures.

The compound components are kinetically stable to each other and to the material of the ceramic shapes to be joined. As to the grain sizes of the various constituents, there is a requirement that they are sufficiently small to support adequate plastic deformation. Thus, grain sizes cannot be excessively large. For the pieces to be joined, at least 50 vol. % of each piece must consist of grains that are 10 microns or smaller. The remaining 50 vol. % can have grains as large as 100 microns. For the joint compound, at least 65 vol. % of the joint must consist of grains that are no larger than 10 microns. The remaining 35 vol. % can consist of grains as large as 100 microns.

To improve mechanical properties such as fracture toughness, whiskers, platelets, chopped fibers, or stable metallic powders can be added. For both the pieces to be joined and the joint compound, up to 35 vol. % whiskers, fibers, platelet grains, or metals can be present. The whiskers or chopped fibers can be as long as 500 microns. If whiskers or fibers are present, however, at least 65 vol. % of the remaining piece or joint material must consist of grains that are no more than 5 microns in average size. And, these smaller grains must have aspect ratios less than 2, that is, they must be nearly equiaxed.

Figure 5:
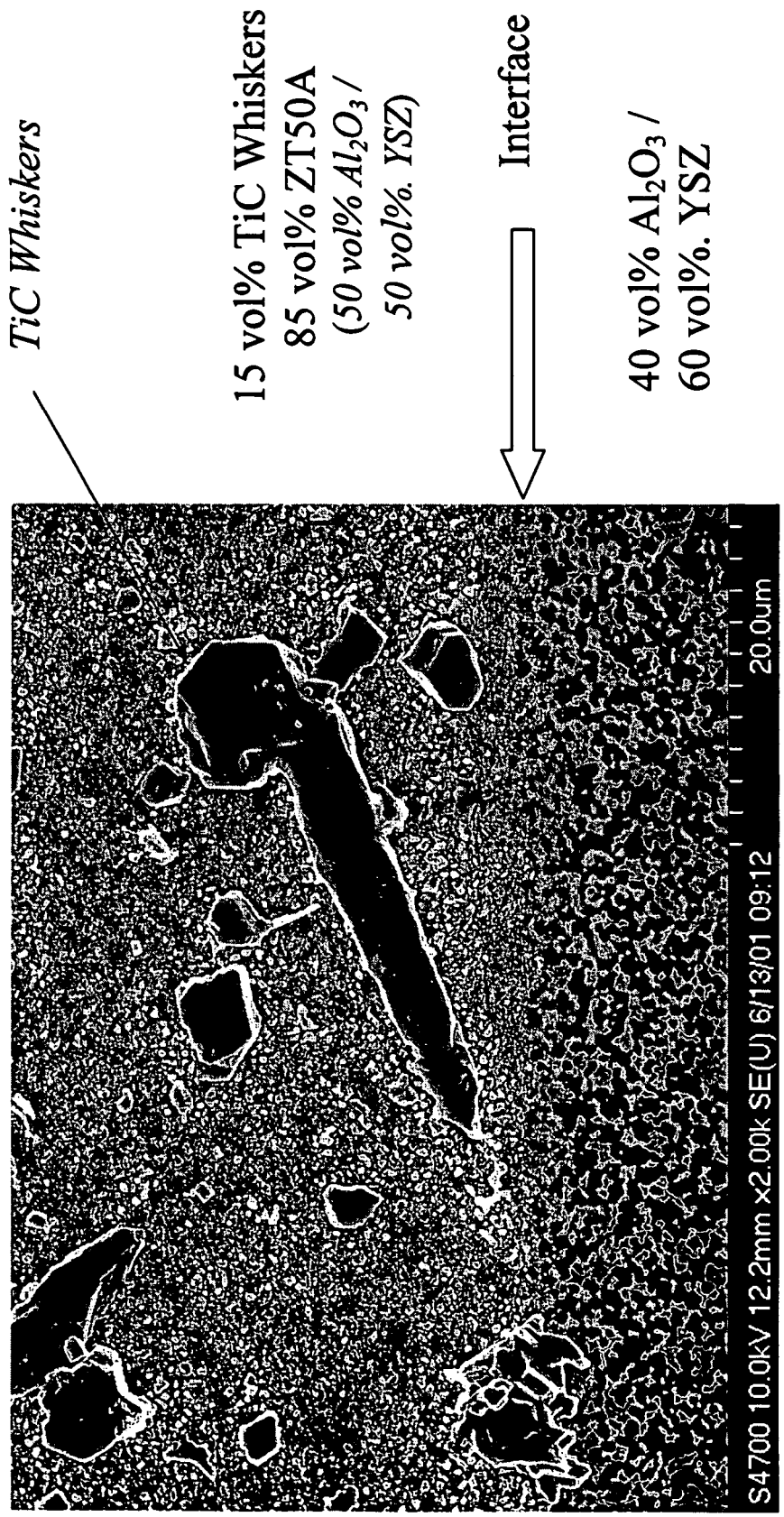
FIG. 5 is a photomicrograph of strengthening agents dispersed in a formulated joint, in accordance with features of the present invention.

FIG. 5 shows successful addition of a ceramic whisker to a joint.

Table 1 below shows how joint toughness is increased when platelet particles or whiskers were incorporated in the joint compound mixture.

TABLE 1

Increase in toughness to 80 vol. % $Al_2O_3$/20 vol. % YSZ with addition of toughening agents

| Toughening agent | Vol. % | Percentage increase in toughness |
|---|---|---|
| TiC whisker | 15 | 40 |
| SiC whisker | 15 | 45 |
| SiC whisker | 25 | 60 |
| $Al_2O_3$ platelet | 20 | 10 |

In the invented technology, the joint material can be eliminated if the two pieces to be joined have the appropriate microstructures, or the joint can be made dense and flaw-free from joint compounds that consist of inexpensive, micron-sized powders suspended in a vehicle. In the preferred embodiment, the joint material is applied by a method that is readily used in industry, typically aerosol-spraying or dip-coating.

Table 2 shows a representative composition for applying the joint compound by aerosol spraying. This material is applied in 2-20 passes by a spray gun, in which a pressurized gas, such as air or nitrogen, is used to propel ceramic-containing droplets to the surfaces to be joined.

TABLE 2

Typical aerosol-spraying formulation for joining $Al_2O_3$/YSZ ceramics.

| Mass (g) | Function | Constituent |
|---|---|---|
| 20 | Powder | 50 vol. % $Al_2O_3$/50 vol. % YSZ or $ZrO_2$ |
| 50 | Solvent | 78 wt. % xylene/22 wt. % butanol |
| 12 | Binder | Rohm & Haas AT-51 (Philadelphia, PA) |
| 1.5 | Plasticizer | Monsanto S-160 (Fayetteville, NC) |
| 0.6 | Dispersant | Solsperse S-9000 (Avecia, Manchester, UK) |

Figure 2:
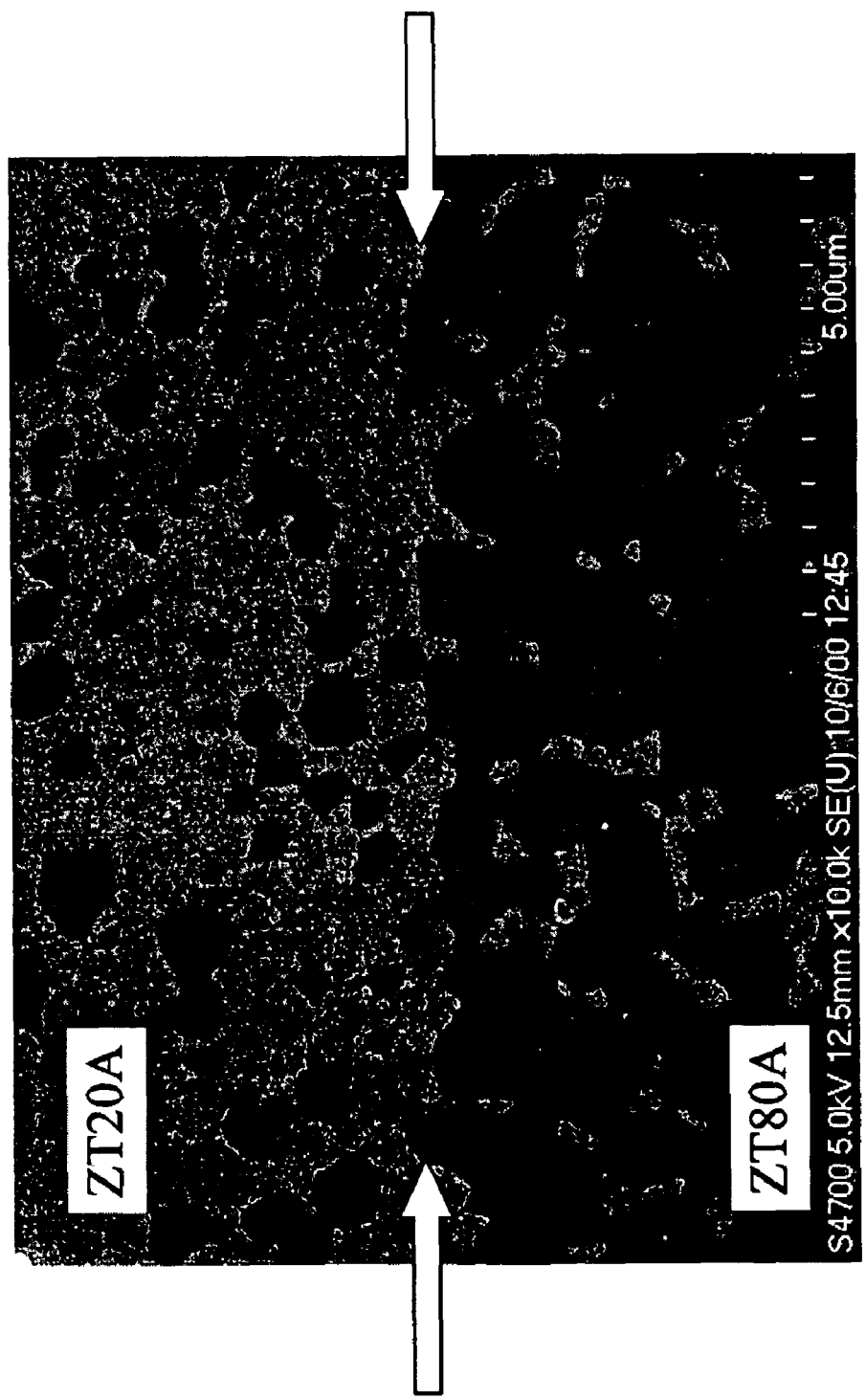
FIG. 2 is a Scanning Electron Microscope (SEM) photomicrograph of a joint between ZT80A (80% $Al_2O_3$/20% $ZrO_2$) and ZT20A (20% $Al_2O_3$/80% $ZrO_2$), in accordance with features of the present invention.

The resulting sprayed coating is porous and contains organic materials. The organics are removed by heating in an atmosphere that is inert or contains oxygen. The temperature range for organics removal is 150-800° C. The time at maximum temperature is 0.1 to 5 hours. After heating, the joint is assembled, and then the entire construct is then heated to a temperature that is below the melting temperature of the lowest melting temperature component in the construct. Excellent results are obtained when the construct is heated to approximately 50-60 percent of the melting temperature of the lowest melting temperature component. Pore-free, i.e., 100 percent dense joints, are obtained, as depicted in FIG. 2.

The above protocol induces formation of a perfect joint. This result is surprising and unexpected. Prior to the invention, it had not proved to be possible to form pore-free joints from what is essentially a loose pile of powder in the joint. Selection of appropriate ceramic powders (or other hard materials) so that grains do not grow, and for which superplasticity is possible in at least one of the majority phases, proved to be essential for this result.

No preparation of the opposing ceramic surfaces is necessary. The surfaces can be either rough or smooth, or a combination thereof, without effecting the quality of the resulting joint. Preferably, the mating surfaces are nearly flat.

FIG. 3 depicts the stress profile (plotted on the y-axis) vs. position in a joint (plotted on the x-axis) in which an intermediate layer has been applied. These experimental data reflect joining of a particulate composite of 80 vol. % $Al_2O_3$/ 20 vol. % YSZ to 20 vol. % $Al_2O_3$/80 vol. % YSZ. The intermediate layer is 50 vol. % $Al_2O_3$/50 vol. % YSZ. The residual hydrostatic stresses at various points are plotted as a function of position. At the far left, indicated by a filled circle is the residual stress present in the 80 vol. % $Al_2O_3$/20 vol. % YSZ ceramic part, i.e., in the absence of a joint. On the far right, indicated by a filled triangle, is the stress present in the 20 vol. % $Al_2O_3$/80 vol. % YSZ ceramic part. The experimental data points, marked by X indicate that the joint has intermediate residual stresses. That is, in the region of the joint, the stresses are lower in magnitude that they are in the free bodies.

Joints which result from a process utilizing joint compound depict a gradual shift of stresses between the subunits. As depicted in FIG. 3, hydrostatic stresses of subunits containing 80 volume percent alumina are one-third those stresses exhibited in subunits containing 20 volume percent alumina. However, the joint between the subunits allows for gradual transfer of said stresses between the subunits.

Surprisingly and unexpectedly, the inventors found that the joint material did not have to be a superplastic material in order for a flaw-free joint to be formed. Perfect joints could be formed, in which the joint material consisted of whisker-, or chopped-fiber-, or platelet-reinforced ceramic composites. The inventors determined that it was sufficient that either the parts to be joined be superplastic materials, such as various $Al_2O_3$/YSZ mixtures, or that the joint consist of at least 65 vol. % of superplastic material. It is well known that whisker-containing ceramic composites do not themselves exhibit superplasticity. Nevertheless, the invention technology was capable of fabricating flaw-free joints with intermediate layers that contained at least 20 vol. % SiC whiskers. These whiskers are important to the final properties of the joint. With their addition, it is possible to form joints that have higher fracture-toughness values those of the ceramics to be joined (see Table 1).

Detail of Ceramic Construction Sans Joint Compound

Surprisingly and unexpectedly, the inventors have found that bodies composed of multiple-phase ceramics or other brittle materials can be seamlessly joined without use of a joint compound. The salient features of the process are the inverse relation between stress and temperature (lower stresses can be used to form the joint if the temperature is increased) and the direct relation between temperature and grain size (smaller grain sizes allow for use of lower temperatures). Selection of particulate composites, in which no one phase is more than 85 vol. % of the total, allows for formation of pore-free joints. The grains of the pieces to be joined must be less than or equal to 10 microns in average size. More preferably, they must be less than 3 microns.

The surface finish, as defined by a standard root-mean-square figure of merit, must be approximately no greater than 2 microns, and preferably no greater than 1 micron. In addition, the initial pieces must be pore-free in order for pore-free joints to be fabricated.

Figure 4:
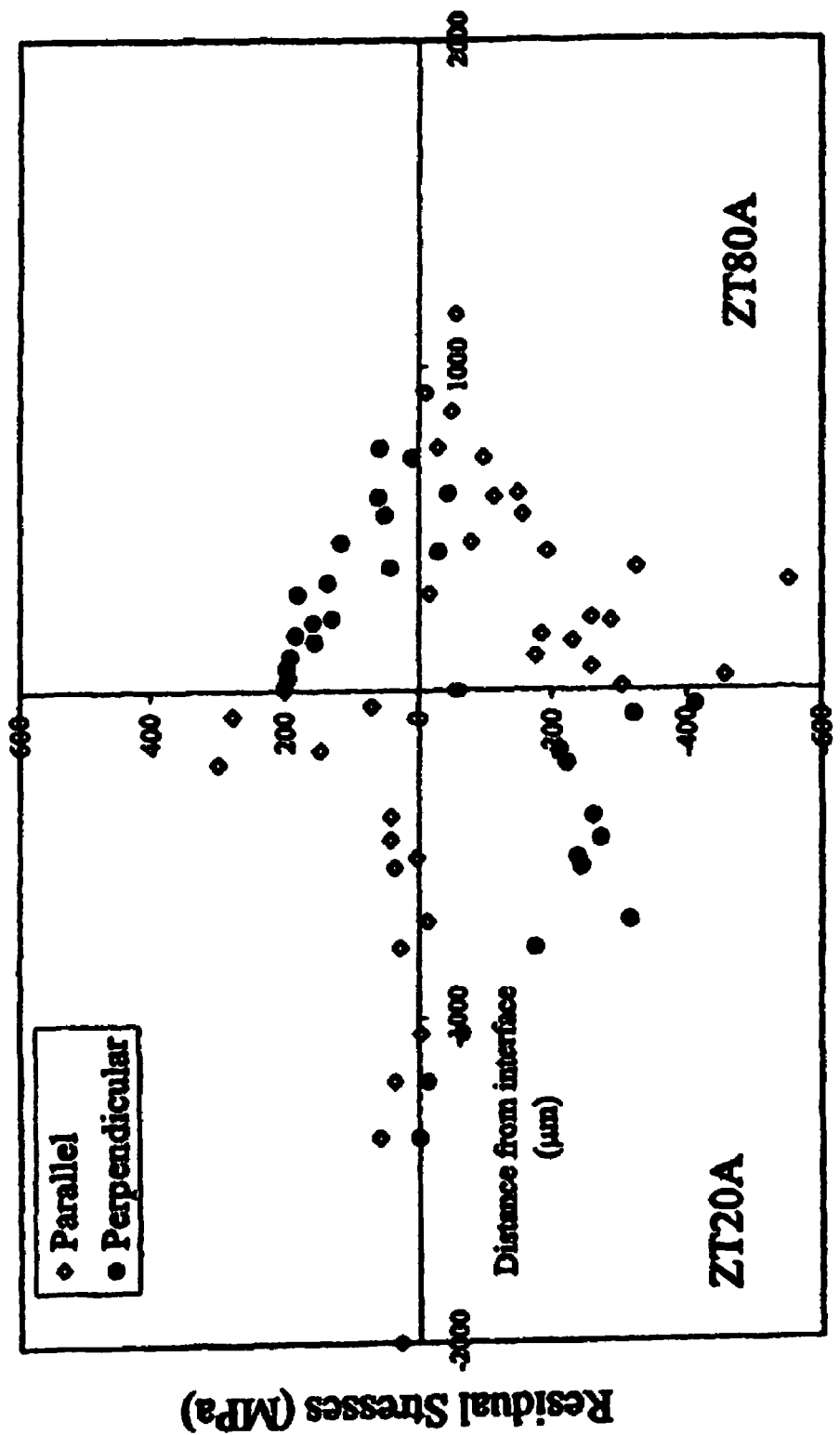
FIG. 4 is a graph depicting residual stresses measured by indentation techniques, in accordance with features of the present invention.

FIG. 4 details residual stresses measured by indentation techniques. The open symbols represents stresses parallel to the interface while closed symbols represent stresses perpendicular to the interface.

Detail of Cermet Joining

Joint production in cermet shape processing has some peculiarities. As with ceramic shape production, the phases in the cermets also must be kinetically stable. Thin and strong metallic joints in cermets can be created by plastic deformation. Although the temperature and stress ranges used to form the cermet joints are similar to those used for the ceramic joints, the cermet joints differ significantly from those in ceramics and other hard materials.

In contrast to the invented protocol utilized for ceramic shape processing, the constituents of joint compounds used in joining cermets are dissimilar to the constituents of the cermets being joined. First, unlike the joining of ceramics, joint compound is usually required in cermet joining.

Second, the resulting joint can be multiphase or single phase (in ceramics, the joint should be multiphase). Third, an additional processing step is required in which the joint compound is reduced or dried to a metal. Fourth, the resulting joints are stronger than the cermets being joined, but the strength arises from a difference in physical properties (in this case, inherent ductility because of activation of dislocation motion), not from a difference in grain size.

The inventors fabricated joints in low-metal-fraction cermets. A joint compound is required. In one protocol, flat surfaces having a finish, as defined by a standard root-mean-square analysis, of 1 micron or less are joined. Finishes of up to 2 microns are suitable. The surfaces are cleaned by standard techniques, such as washing with a solvent such as acetone or methyl alcohol. In one scenario, the surfaces to be joined are coated with a solution of metal nitrates or acetates. The solution may also contain dispersed, fine particles of carbides or nitrides, such as WC, TiC, or TiN. These hard particles are generally the same as those that are present in the host cermets. The hard carbide and/or nitride particles must be smaller than 2 microns for a pore-free joint to be formed. In addition, the volume fraction of hard particle in the final joints can be no greater than 0.5. The solution is applied by sequential dip-coating, spraying, or painting. The solvent can be water, various alcohols, or other suitable solvents. While any metal is acceptable, the metal in solution is preferred to be similar to the metal in the cermet (for example, transition metals). Suitable metals include Ti, Mn, Fe, Co, Ni, and Zr. Co is the most common.

Once the metal solution is added to the surface, the solution is then decomposed. One method of decomposition includes heating the solution-coated surfaces in a reducing atmosphere at moderate temperatures. For example, the solution coated surfaces can be placed in a hydrogen-gas laden atmosphere, at temperatures between 150 and 800° C. for a time sufficient for the solution to be converted to metal.

After the solution decomposes from the surface, the surfaces are joined at 1000° C. and under stresses of between 500 and 45,000 psi. Preferable pressure is between 100 psi and 15,000 psi. The atmosphere should be reducing so that no oxide forms in the joint. The pieces to be joined should be flat. The resulting joints are one of two types: (1) Pieces joined directly by a metal such as Co, in which case the joint thickness should be approximately less than 5 microns, (2) Pieces joined with a composite of metal such as Co and up to 50% of the volume consists of hard particles such as WC, in which case the joint can be up to 10 microns thick.

EXAMPLE 1

Dense $Al_2O_3$/YSZ pellets, denoted ZTA, are joined without an intermediate layer. The invented protocol allows for one of the pellets to be from 15 to 85% $Al_2O_3$, with the balance being YSZ, and the other pellet being from 0 to 100% $Al_2O_3$, with the balance being YSZ. The pellets are prepared by blending starting powders well in the case of particulate ZTA composites or simply weighing out powders in the case of monolithic ceramics. The powders are then cold-pressed into compacts, which are sintered in air, oxygen, or inert atmosphere at temperatures of 1400-1600° C.

Thermal-expansion coefficients of the ceramics and composites were measured in a Theta Industries Dilatronic (Port Washington, N.Y.).

Specimens were joined in an Instron universal testing apparatus (Canton, Mass.). Once the two surfaces are mated, the construct is placed into an Instron universal testing apparatus (Canton, Mass.). The construct and Instron compression rams are then heated to a temperature that is approximately 0.6 that of the melting point of $Al_2O_3$. In the case of the specific joint in this example, in which 80 vol. % $Al_2O_3$/20 vol. % YSZ is joined to 20 vol. % $Al_2O_3$/80 vol. % YSZ, the temperature is 1350° C. Initial strain rates for the application of pressure were $10^{-5}$ per second and the total strain is less than 10%. (The strain figure refers to total compressive deformation relative to the initial height of the entire construct.) Application of a maximum pressure of 1500 psi for less than 1 hour is sufficient to induce enough plastic deformation by grain-boundary sliding to form a pore-free joint (FIG. 2).

Joined specimens were sectioned, polished, and examined by scanning electron microscopy (SEM) in a Hitachi S-4700-II (Tokyo, Japan). Vickers microhardness measurements on polished specimens were made with a Model MV-1 hardness tester (Matsuzawa, Ishikawa, Japan).

Any attempt to fabricate the same joint using more typical diffusional bonding requires temperatures exceeding 1550 C. Also, elaborate (and therefore expensive) surface preparation is necessary. In the end, and despite these more elaborate procedures, an imperfect joint results from conventional joining techniques.

EXAMPLE 2

If an intermediate joint compound is used, the dense bodies to be joined can be, but are not limited to, ZTA composites, or pure $Al_2O_3$, or pure $ZrO_2$. They are prepared in the same manner as described in Example 1. Once they have been sintered, they are coated with the joint material.

In this example, a dense 60 vol. % $Al_2O_3$/40 vol. % YSZ body is joined to a dense 40 vol. % $Al_2O_3$/60 vol. % YSZ body. The intermediate layer is 50 vol. % $Al_2O_3$/50 vol. % YSZ (50ZTA), which is applied by aerosol spraying. No surface preparation is required of the bodies to be joined. The joint material is prepared by blending 2 g of 50ZTA, 5 g of solvent, 1.2 g of Rohm & Haas AT-51 binder, 0.15 g of Monsanto S-160 plasticizer, and 0.06 g of Avecia S-9000 dispersant. These constituents are placed in a 25 mL polyethylene jar, along with YSZ grinding media. The jar was then sealed and placed on a ball-mill rack. The mixture is milled for approximately 16 hours.

After milling, the mixture is placed into an aerosol-spray nozzle and applied to the surface of each ZTA body. Nitrogen gas is used as the propellant. 20 individual passes are used to apply the joint material. The coated bodies are then heated in air to 600° C. to remove the organics. The surfaces to be joined are mated, and then the resulting construct is placed into an Instron universal testing apparatus (Canton, Mass.). The construct and Instron compression rams are then heated to a temperature that is approximately 0.6 that of the melting point of $Al_2O_3$. In the case of the specific joint in this example, the temperature is 1350° C. Initial strain rates for the application of pressure are $10^{-5}$ per second and the total strain during joining is less than 5%. Application of a maximum pressure of 1500 psi for less than 0.5 hour is sufficient to induce enough plastic deformation by grain-boundary sliding to form a pore-free joint.

EXAMPLE 3

A commercial cermet containing approximately 6 vol. % Co metal, with WC and TiC as the hard particles, is bonded. Flat surfaces of the cermet are coated with a metallic nitrate solution. The solution is prepared by dissolving 1 g of $Co(NO_3)_2$ into 2 g of isopropyl alcohol. The solution is applied to a surface of each cermet by painting. Each droplet is allowed to dry before the next was added. Two droplets are added to each surface to be joined.

Figure 6:
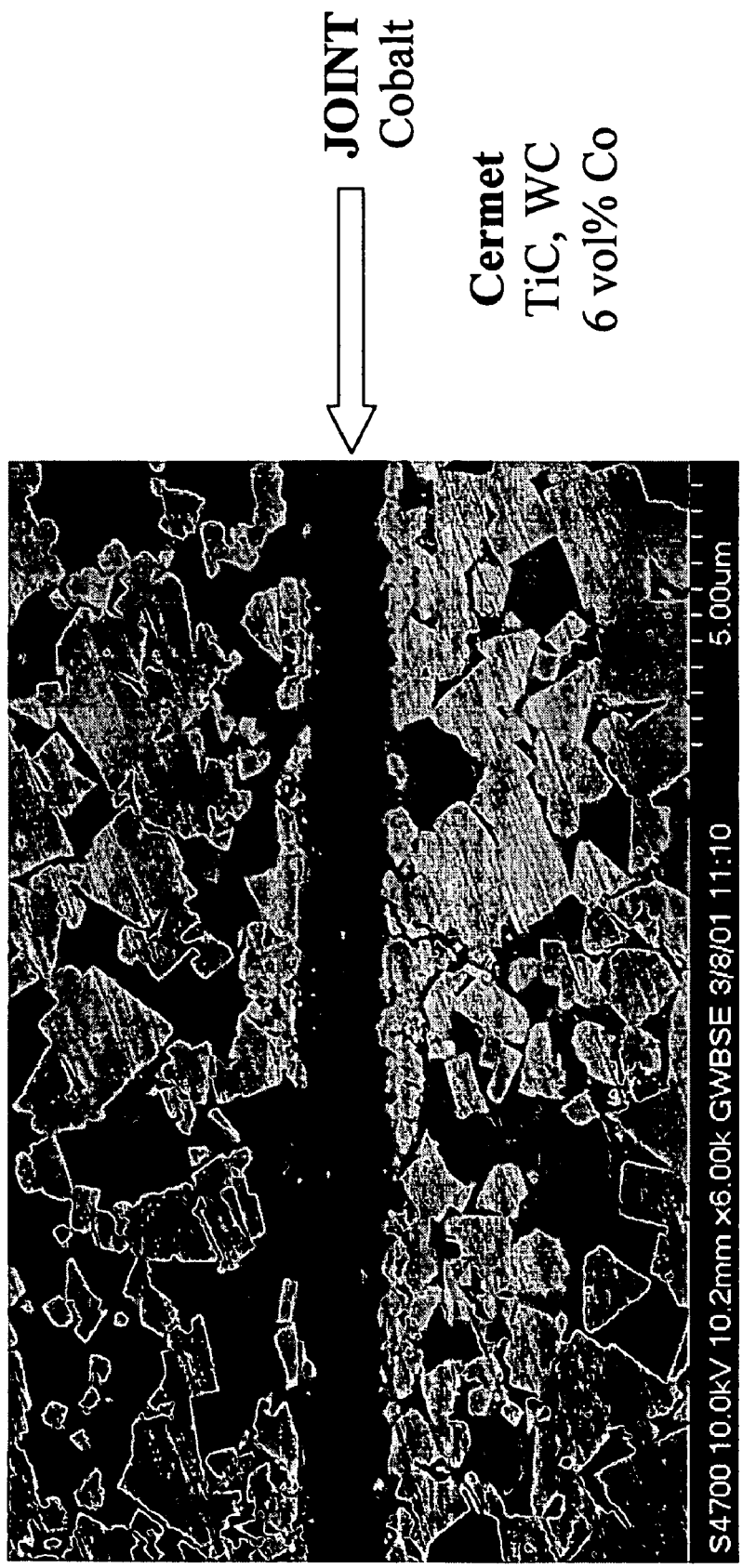
FIG. 6 is a photomicrograph of a cobalt interlayer used to join cermet shapes, in accordance with features of the present invention.

The coated surfaces are then heated in a 0.1% $H_2$/balance Ar atmosphere to 600° C. to decompose the nitrates to metallic Co. The coated surfaces are then mated and then the resulting construct is placed into an Instron universal testing apparatus (Canton, Mass.). The construct and Instron compression rams are then heated to a temperature of 1000° C. Initial strain rates for the application of pressure are $10^{-5}$ per second and the total strain is less than 1%. Application of a maximum pressure of 1000 psi for less than 1.5 hour is sufficient to induce enough plastic deformation in the Co to form a pore-free joint (FIG. 6).

While the invention has been described with reference to details of the illustrated embodiment, these details are not intended to limit the scope of the invention as defined in the appended claims. Other modifications of the materials presented above are also possible.

The invention claimed is:

1. A method for seamlessly joining together objects made of cermet, the method comprising:
   a) selecting opposing surfaces of the objects having surface finishes as defined by root-mean-square values of up to 2 microns;
   b) coating the surfaces with a fluid containing a metal;
   c) decomposing the metal containing fluid so as to leave the metal on the surfaces; and
   d) contacting the surfaces to each other for a time and at a temperature and pressure sufficient to form an irreversible bond between the objects.

2. The method as recited in claim 1 wherein the metal is identical to a metal contained in the objects.

3. The method as recited in claim 1 wherein the metal is Ti, or Co, or Fe, or Mn, or Zr, or Ti-alloy, or Co-alloy, or Fe-alloy, or Mn-alloy, or combinations thereof.

4. The method as recited in claim 2 wherein the fluid is a metal solution selected from the group consisting of metallic nitrates, metallic acetates, metallic hydroxides, metallic alkoxides, colloidal suspension of metals in solvents, or combinations thereof.

5. The method as recited in claim 1 wherein the residue has a thickness of five microns or less.

6. The method as recited in claim 1 wherein the fluid contains suspended hard particles, the particles selected from the group consisting of WC, TiC, TiN, or combinations thereof.

7. The method as recited in claim 6 wherein the suspended particles are less than or equal to 2 microns in diameter.

8. The method as recited in claim 1 wherein the residue has a thickness of less than or equal to 10 microns.

9. The method as recited in claim 1 wherein the objects undergoing seamless joining are allowed to deform during said joining process.

10. The method as recited in claim 1 wherein the decomposition step occurs in a reducing atmosphere.

11. The method as recited in claim 1 wherein the decomposition step occurs in an inert atmosphere.

12. The method as recited in claim 10 wherein the atmosphere contains hydrogen gas maintained at a temperature between 150-800° C.

13. The method as recited in claim 10 wherein the atmosphere contains hydrogen gas and argon.

14. The method as recited in claim 10 wherein the atmosphere is maintained at 150° C.

* * * * *